United States Patent Office 2,799,697
Patented July 16, 1957

2,799,697

PROCESS FOR THE MANUFACTURE AND PURIFICATION OF MALONONITRILE

Emil J. Maxion, Queens Village, N. Y., assignor to Chase Chemical Company, Newark, N. J., a corporation of New Jersey No Drawing. Application September 15, 1954,
Serial No. 456,318

14 Claims. (Cl. 260—465.2)

This invention relates to improvements in the preparation and purification of malononitrile and comprises the use of stabilizing agents for the reaction mixture in the dehydration of cyanoacetamide to malononitrile in an inert solvent wherein phosphorus oxychloride or phosphorus pentachloride, or mixtures thereof, are used as the dehydrating agents and the use of stabilizing agents during the recovery of the malononitrile in purified condition.

Phosphorus pentoxide, phosphorus pentahalides and phosphorus oxyhalides have heretofore been employed or proposed in the transformation of amides to nitriles. In general, it has been found that the pentoxide is much less satisfactory for this purpose than the pentahalides or oxyhalides. Although nitriles do in fact result from the practice of the more acceptable of the prior art methods, these procedures are characterized by inherent and serious disadvantages which make their use objectionable and impracticable on an industrial scale.

One of the more serious disadvantages of the known processes is the necessity of using excessively large quantites of dehydrating agent, i. e., up to eight times the molar excess is required when the oxychloride is used alone. Another important drawback resides in the fact that when using the pentachloride, the oxychloride, or mixtures thereof, for effecting dehydration of amides to nitriles in an inert solvent, an unworkable resin is deposited which remains technicologically unmanageable even when an attempt is made to absorb this undesirable by-product on an inert substance such as Celite or rock salt. In this type of procedure, it is found that if the nitrile formed by the reaction is extracted from the resinous mass and an attempt is made to recover the said nitrile reaction product by removal of the solvent followed by distillation, resinous material continues to deposit in the recovery vessel. Inasmuch as this deposit necessitates unduly long heating periods at elevated temperatures during the distillation of the nitrile, it is not surprising that some nitriles are found to decompose violently. This decomposition is frequently manifested by darkening of the liquid, spontaneous boiling and foaming and, finally, if adequate precautions are not taken, spurting of the liquid from the vessel in a cloud of fumes and burning decomposition products.

According to the present invention, it has been found that a process which is both economically and technologically markedly superior, in comparison to prior methods, can be carried out by employing an inorganic sulfite, such as an alkali metal sulfite or bisulfite (including the preferred metabisulfites), and an inert solvent, such as acetylene tetrachloride or ethylene dichloride, in the dehydration of cyanoacetamide to malononitrile with phosphorus oxychloride, phosphorus pentachloride, or mixtures thereof. The improvements in the process of the invention are striking as will be hereinafter more fully appreciated from the examples.

The amount of the selected stabilizing inorganic sulfite has been found to be not critical, although it is highly desirable to use sufficient sulfite to yield about one (1) mol of $SO_2$ for each mol of water removed from the amide. The use of a specific inert solvent or a specific amount of solvent has also been found not to be critical. Any liquid hydrocarbon or liquid halogenated hydrocarbon may be used in any quantity necessary suitably to suspend the solid components of the reaction mixture. Ethylene dichloride is particularly suitable as the solvent since it produces high yields of the desired product, it is not readily flammable and also has a boiling point at which the reaction takes place smoothly.

The invention can be carried out successfully with phosphorus pentachloride, phosphorus oxychloride, or mixtures thereof, and hence the choice of dehydrating agent is not critical. It has been found, however, that the use of phosphorus oxychloride is particularly satisfactory due to the fact that it is a liquid which is immediately miscible in the preferred solvent and thus available to take part in the reaction, but mixtures of phosphorus oxychloride with phosphorus pentachloride, or the pentachloride alone, have been used with success. It is observed, however, that in theory one (1) mol of phosphorus pentachloride will dehydrate three (3) mols of amide to nitrile whereas one (1) mol of phosphorus oxychloride will dehydrate only two (2) mols of amide to nitrile. In the preferred process, it is necessary to use only a slight excess of dehydrating agent or mixture of dehydrating agents and, in practice, 1.25 mols of dehydrating agent or mixture are used for each two (2) mols of the amide. The advantages of such are evident.

The invention is well illustrated by but not limited to the following examples which show how the process is carried out in practice.

EXAMPLE I

*Production of malononitrile*

Two hundred (200) milliliters of phosphorus oxychloride was added slowly to a stirring mixture of three hundred and fifteen (315) grams of commercial grade cyanoacetamide and two hundred and fifty-two (252) parts of sodium metabisulfite in one (1) liter of ethylene dichloride under reflux. The mixture was stirred and refluxed for six hours, then cooled and filtered with the aid of suction. The filter cake was washed twice with portions of 150 ml. each of fresh ethylene dichloride. The filtrates were combined and then placed in a suitable round bottom flask and the volatile solvent plus any remaining phosphorus oxychloride was removed and recovered by vacuum distillation.

The remaining material consisted of practically pure malononitrile and weighed approximately 190 grams, corresponding to a yield of about 75% of theoretical based on the weight of the cyanacetamide.

EXAMPLE II

*Malononitrile purification*

Ninety-five (95) grams of malononitrile obtained in accordance with Example I were transferred to a Claisen flask equipped with a thermometer well to the flask bottom, a capillary air inlet and thermometer in the distilling neck. The flask was placed under a vacuum of four (4) millimeters of mercury and then placed in a metal bath maintained at a temperature of 120° C. After a forerun of about four (4) milliliters, water-white malononitrile began to distill at a temperature of 82–84° C. After five minutes had elapsed, the material in the distilling flask turned orange and then dark red-brown. At this point foaming became appreciable and the distillation rate dropped to nil. The temperature of the metal bath was then raised to 145° C. At this point in the distillation the foaming became unmanageable. The pressure in the system rose to 50 mm. indicating that gases were being liberated and that decomposition was taking place. The distillation was then stopped in order to eliminate the possibility of any explosion.

EXAMPLE III

*Malononitrile purification*

Ninety-five (95) grams of the material obtained in Example I were transferred to a distillation flask as in Example II. Five (5) grams of dry potassium metabisulfite were added. The flask was placed in a metal bath maintained at 120° C. After a forerun of four (4) milliliters the receiving flask was changed. The malononitrile distilled over smoothly and completely at 82–83° C. at 4 mm. This material was pure white, possessed a faint odor of acetamide and had a melting point of 33–34° C. The yield was 73% based on the original quantity of cyanoacetamide.

EXAMPLE IV

*Malononitrile production*

Sodium sulfite was used under the exact experimental conditions set forth in Example I. In this case a yield of 73% of practically pure malononitrile was obtained based upon the cyanoacetamide.

EXAMPLE V

*Malononitrile purification*

Ammonium sulfite was used under the same experimental conditions as Example III. A 73% yield of pure white crystalline malononitrile was obtained.

From the foregoing it will be appreciated how the practice of the present invention gives markedly superior results as contrasted with prior known methods. The above also demonstrates the ease, smoothness and economy which the present invention makes possible in the production and purification of malononitrile as well as the avoidance of the disadvantages and hazards of the heretofore known or proposed practices. The invention, therefore, makes an important and significant advance in this art.

The above is presented as illustrative and not as limitative since other modifications may be made without departing from the invention as defined by the appended claims.

I claim:

1. A process for the preparation of malononitrile which comprises heating a mixture consisting essentially of cyanoacetamide with a dehydrating agent selected from the group consisting of phosphorus oxychloride, phosphorus pentachloride, and mixtures thereof in an inert organic solvent and in the presence of an inorganic sulfite selected from the group consisting of alkali metal and ammonium sulfites and bisulfites, and recovering the malononitrile thus formed, the dehydrating agent being employed in at least the theoretically required proportions but no more than about 1.25 moles for each two moles of cyanoacetamide.

2. A process according to claim 1, in which the inorganic sulfite is an inorganic metabisulfite.

3. A process according to claim 1, in which the inert solvent is ethylene dichloride.

4. A process according to claim 2, in which the inert solvent is ethylene dichloride.

5. A process according to claim 1, in which the dehydrating agent is phosphorus oxychloride and is present in the amount of about 0.5 mol per mol of cyanoacetamide and the inorganic sulfite is employed in an amount sufficient to liberate about 1 mol of $SO_2$ per mol of water removed in the reaction.

6. A process according to claim 2, in which the dehydrating agent is phosphorus oxychloride and is present in the amount of about 0.5 mol per mol of cyanoacetamide and the inorganic metabisulfite is employed in an amount sufficient to liberate about 1 mol of $SO_2$ per mol of water removed in the reaction.

7. A process according to claim 5, in which the inert solvent is ethylene dichloride.

8. A process according to claim 6, in which the inert solvent is ethylene dichloride.

9. A process for purifying malononitrile which comprises subjecting to distillation a mixture consisting essentially of malononitrile and solid inorganic sulfite selected from the group consisting of alkali metal and ammonium sulfites and bisulfites.

10. The process of claim 9 in which the inorganic sulfite is sodium sulfite.

11. The process of claim 9 in which the inorganic sulfite is potassium sulfite.

12. The process of claim 9 in which the inorganic sulfite is ammonium sulfite.

13. The process of claim 9 in which the inorganic sulfite is sodium metabisulfite.

14. The process of claim 9 in which the inorganic sulfite is potassium metabisulfite.

References Cited in the file of this patent

UNITED STATES PATENTS

| | | |
|---|---|---|
| 2,242,309 | Lazier et al. | May 20, 1941 |
| 2,389,217 | Surrey | Nov. 20, 1945 |
| 2,459,128 | Fahrenbach | Jan. 11, 1949 |